(12) United States Patent
Fujii et al.

(10) Patent No.: US 10,101,873 B2
(45) Date of Patent: Oct. 16, 2018

(54) PORTABLE TERMINAL HAVING USER INTERFACE FUNCTION, DISPLAY METHOD, AND COMPUTER PROGRAM

(71) Applicant: Sony Computer Entertainment Inc., Tokyo (JP)

(72) Inventors: Takahiro Fujii, Tokyo (JP); Hidenori Karasawa, Kanagawa (JP); Shuji Hiramatsu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 469 days.

(21) Appl. No.: 14/918,696

(22) Filed: Oct. 21, 2015

(65) Prior Publication Data

US 2016/0041721 A1 Feb. 11, 2016

Related U.S. Application Data

(63) Continuation of application No. 13/350,941, filed on Jan. 16, 2012.

(30) Foreign Application Priority Data

Jan. 26, 2011 (JP) .................................. 2011-014539
Jan. 26, 2011 (JP) .................................. 2011-014540

(Continued)

(51) Int. Cl.
*G06T 15/00* (2011.01)
*G06F 3/0481* (2013.01)
(Continued)

(52) U.S. Cl.
CPC ........ *G06F 3/04817* (2013.01); *G06F 1/1684* (2013.01); *G06F 1/1694* (2013.01);
(Continued)

(58) Field of Classification Search
CPC . G06T 19/20; G06T 2219/2016; G06T 15/20; G06T 2215/16; G06F 3/0346;
(Continued)

(56) References Cited

U.S. PATENT DOCUMENTS 6,567,101 B1    5/2003  Thomas
7,301,527 B2 * 11/2007  Marvit .................. G06F 1/1626
                                                          345/156

(Continued)

FOREIGN PATENT DOCUMENTS

EP    2207077 A1    7/2010
JP    08016353 A    1/1996

(Continued)

OTHER PUBLICATIONS

JP Office Action with English translation for corresponding JP Patent Application No. 2011-014540, dated Apr. 15, 2014.

(Continued)

*Primary Examiner* — Phu K Nguyen
(74) *Attorney, Agent, or Firm* — Matthew B. Dernier, Esq.

(57) ABSTRACT

A portable terminal is provided with: a display device; a sensor configured to detect the orientation or position of the portable terminal; a data storage unit configured to store data; and a display control unit configured to display on the display device an icon or object that corresponds to the data stored in the data storage unit. The display control unit acquires information regarding the orientation or position of the portable terminal from the sensor and determines a display mode of the icon or object in accordance with a change in the orientation or position of the portable terminal.

20 Claims, 11 Drawing Sheets

(30) Foreign Application Priority Data

Jan. 26, 2011 (JP) ................................ 2011-014541
Jan. 26, 2011 (JP) ................................ 2011-014542
Jan. 26, 2011 (JP) ................................ 2011-014543

(51) Int. Cl.
*G06F 3/0346* (2013.01)
*G06F 1/16* (2006.01)
*G06F 3/0485* (2013.01)
*G06T 15/20* (2011.01)
*G06T 19/20* (2011.01)
*G06F 3/0484* (2013.01)
*G06F 3/0488* (2013.01)

(52) U.S. Cl.
CPC .......... *G06F 3/0346* (2013.01); *G06F 3/0485* (2013.01); *G06F 3/0488* (2013.01); *G06F 3/04815* (2013.01); *G06F 3/04842* (2013.01); *G06T 15/20* (2013.01); *G06T 19/20* (2013.01); *G06F 2200/1637* (2013.01); *G06F 2203/04806* (2013.01); *G06T 2215/16* (2013.01); *G06T 2219/2016* (2013.01)

(58) Field of Classification Search
CPC .. G06F 1/1684; G06F 1/1694; G06F 3/04815; G06F 3/0485; G06F 2200/1637; G06F 2203/04806; G06F 3/04817; G06F 3/04842; G06F 3/0488
USPC ......................................................... 345/418
See application file for complete search history.

(56) References Cited

U.S. PATENT DOCUMENTS

| | | | |
|---|---|---|---|
| 8,120,625 B2 | 2/2012 | Hinkley | |
| 8,185,169 B2 | 5/2012 | Griffin | |
| 8,191,011 B2 | 5/2012 | Abanami | |
| 8,305,365 B2 | 11/2012 | Takata | |
| 8,531,486 B2 | 9/2013 | Petri | |
| 8,581,905 B2 | 11/2013 | Mitchell | |
| 8,587,417 B2 | 11/2013 | Birnbaum | |
| 8,881,041 B2 | 11/2014 | Park | |
| 9,928,218 B2 * | 3/2018 | Cranfill | G06F 17/214 |
| 2006/0242596 A1 | 10/2006 | Armstrong | |
| 2009/0201270 A1 | 8/2009 | Pikkujamsa | |
| 2009/0289924 A1 | 11/2009 | Takada | |
| 2010/0013653 A1 | 1/2010 | Birnbaum | |
| 2010/0070926 A1 | 3/2010 | Abanami | |
| 2011/0099492 A1 | 4/2011 | Park | |
| 2013/0201141 A1 | 8/2013 | Birnbaum | |
| 2014/0091914 A1 | 4/2014 | Birnbaum | |
| 2014/0104162 A1 | 4/2014 | Birnbaum | |

FOREIGN PATENT DOCUMENTS

| | | |
|---|---|---|
| JP | 11196397 A | 7/1999 |
| JP | 2000207079 A | 7/2000 |
| JP | 2003511785 A | 3/2003 |
| JP | 2003223095 A | 8/2003 |
| JP | 2006157182 A | 6/2006 |
| JP | 2008113746 A | 5/2008 |
| JP | 2009282857 A | 12/2009 |
| JP | 2010003260 A | 1/2010 |
| JP | 2011528476 A | 11/2011 |
| JP | 2012503253 A | 2/2012 |
| WO | 2010009157 A1 | 1/2010 |

OTHER PUBLICATIONS

JP Office Action with English translation for corresponding JP Patent Application No. 2011-014539, dated Apr. 15, 2014.

"What Is Windows Aero?," Internet <URL: http://windows.microsoft.com/jajp/windows-vista/what-is-windows-aero> 4 pages, [searched on Apr. 7, 2014]. (For relevancy see pp. 4-5 of English translation for corresponding JP Patent Application No. 2011-014539, dated Apr. 15, 2014).

JP Office Action with English translation for corresponding JP Patent Application No. 2011-014542, dated May 20, 2014.

JP Office Action with English translation for corresponding JP Patent Application No. 2011-014543, dated Jun. 10, 2014.

JP Office Action with English translation for corresponding JP Patent Application No. 2011-014543, dated Oct. 7, 2014.

Office Action for related U.S. Appl. No. 13/350,941, dated Apr. 11, 2014.

Office Action for related U.S. Appl. No. 13/350,941, dated Sep. 8, 2014.

Office Action for related U.S. Appl. No. 13/350,941, dated Mar. 10, 2015.

* cited by examiner

FIG. 4

| ICON ID | ICON NAME | SHORT NAME | PATH | COORDINATES | SHAPE DATA |
|---|---|---|---|---|---|
| 001 | ALBUM OF LOVELY DOGS | DOG ALBUM | C:¥PHOTO¥DOG | (100, 20, 10) | dog.bmp |
| 002 | MOVIES | MOVIES | C:¥MOVIE | (200, 20, 10) | movie.bmp |
| ⋮ | ⋮ | ⋮ | ⋮ | ⋮ | ⋮ |

62

PORTABLE TERMINAL HAVING USER INTERFACE FUNCTION, DISPLAY METHOD, AND COMPUTER PROGRAM

CROSS REFERENCE TO RELATED APPLICATIONS

This is a continuation of U.S. patent application Ser. No. 13/350,941, accorded a filing date of Jan. 16, 2012, the entire disclosure of which is hereby incorporated by reference.

BACKGROUND OF THE INVENTION

1. Field of the Invention

The present invention relates to user interface techniques and, particularly, to portable terminals having user interface functions and to display methods available in the portable terminals.

2. Description of the Related Art

In personal computers, smartphones, etc., user interfaces are widely employed that display icons corresponding to data, applications, etc., on the screen of a display device and, upon reception of an operation input such as double-clicking of an icon, display data that corresponds to the icon or start an application.

In recent years, portable game devices or portable phone terminals have been widely used, and occasions of touching such user interfaces in daily life have increased dramatically. As well as user-friendliness, attempts to devise a display that is visually entertaining and does not get boring have become highly demanded.

SUMMARY OF THE INVENTION

In this background, a purpose of the present invention is to provide user interfaces with high entertainment value.

One embodiment of the present invention relates to a portable terminal. The portable terminal comprises: a display device; a sensor configured to detect the orientation or position of the portable terminal; a storage unit configured to store data; and a display control unit configured to display on the display device an icon or object that corresponds to the data stored in the storage unit, wherein the display control unit acquires information regarding the orientation or position of the portable terminal from the sensor and determines a display mode of the icon or object in accordance with a change in the orientation or position of the portable terminal.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a diagram showing exemplary internal data in an icon table;

DETAILED DESCRIPTION OF THE INVENTION

The invention will now be described by reference to the preferred embodiments. This does not intend to limit the scope of the present invention, but to exemplify the invention.

Figure 1:
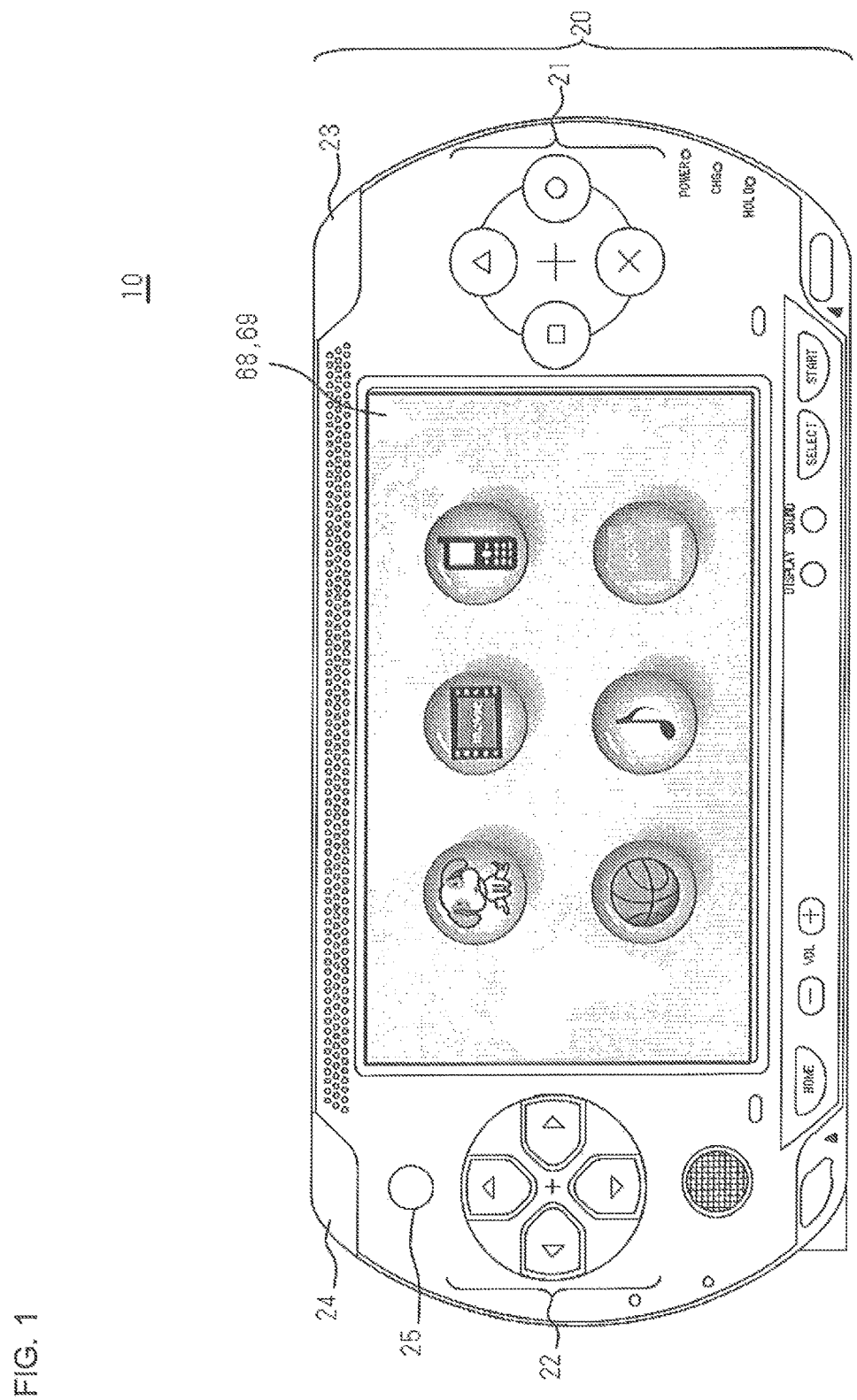
FIG. 1 shows the appearance of a portable terminal according to the embodiment.
Figure 2:
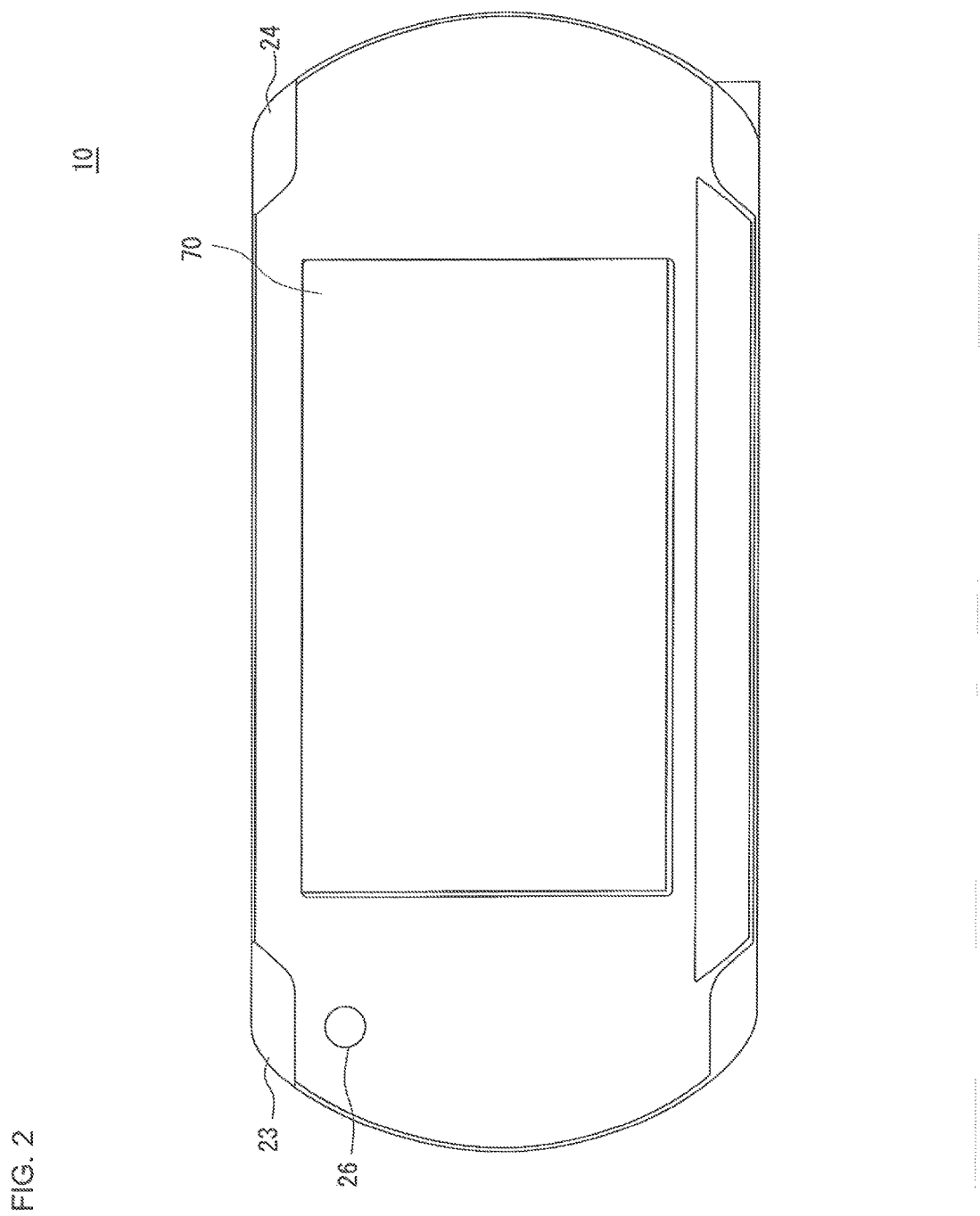
FIG. 2 shows the appearance of the portable terminal according to the embodiment.

FIGS. 1 and 2 show the appearance of a portable terminal 10 according to the embodiment. As shown in FIG. 1, the front face of the portable terminal 10, i.e., the side facing the user as the user holds and controls the portable terminal 10, is provided with buttons 20 comprising command input buttons 21, directional keys 22, an R button 23, and an L button 24, and is also provided with an upper camera 25 and a display device 68. A touch panel 69 for sensing contact by the user's finger or a stylus pen is installed at the display device 68.

As shown in FIG. 2, a rear camera 26 and a rear touch panel 70 are provided on the back of the portable terminal 10. A display device may be provided on the back of the portable terminal 10 similarly to the front face. In this embodiment, a display device is not provided on the back of the portable terminal 10 and only the rear touch panel 70 is provided.

The user holding the portable terminal 10 with both hands can control the command input buttons 21 with the right thumb, control the directional keys 22 with the left thumb, control the R button 23 with the right index finger or middle finger, control the L button 24 with the left index finger or middle finger, control the touch panel 69 with both thumbs, and control the rear touch panel 70 with both ring fingers or little fingers. When using a stylus pen, the user may hold the portable terminal 10 with the left hand. A stylus pen held by the right hand or the index finger may be used to control the touch panel 69 and the command input buttons 21. The user may control the directional keys 22 with the left thumb, control the L button 24 with the left index finger or middle finger, and control the rear touch panel 70 with the left ring finger or little finger.

As shown in FIG. 1, when an application such as a game is not being executed in the portable terminal 10, a user interface screen (hereinafter, also referred to as a "desktop screen") for receiving a command input for opening a data file or starting an application is displayed on the display device 68. On the desktop screen, icons associated with data files and applications are displayed side by side. In the present embodiment, an icon is expressed as an object having a three-dimensional button shape, giving the icon the appearance of floating against background image when displayed. The shadow of the icon is displayed on the background image. The portable terminal 10 provides a function of changing a display manner of an icon and a background image according to the position and orientation of the portable terminal 10.

Figure 3:
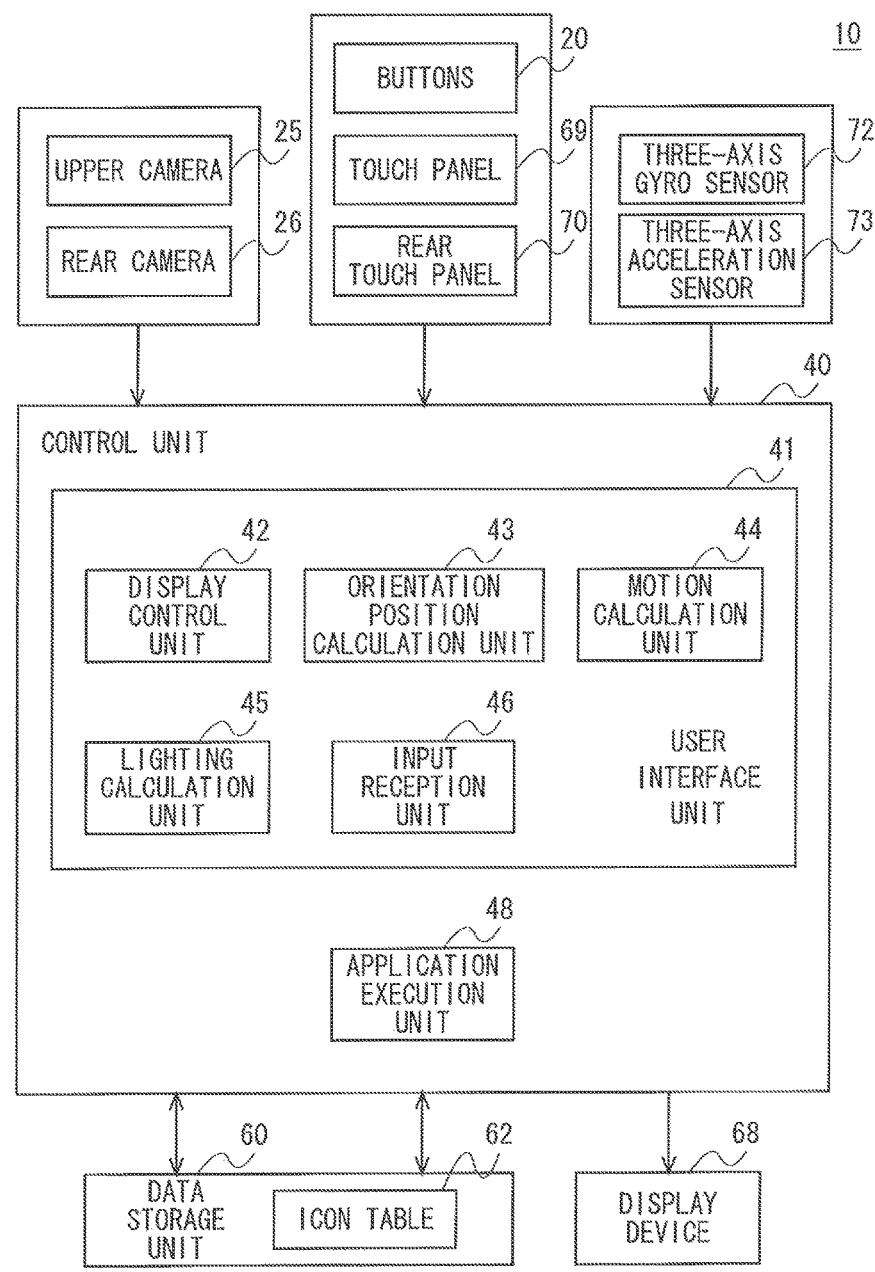
FIG. 3 is a diagram showing the configuration of the portable terminal.

FIG. 3 shows the configuration of the portable terminal 10. The portable terminal 10 comprises an upper camera 25, a rear camera 26, buttons 20, a touch panel 69, a rear touch panel 70, a three-axis gyro sensor 72, a three-axis acceleration sensor 73, a control unit 40, a data storage unit 60, an icon table 62, and a display device 68. These configurations are implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

The upper camera 25 and the rear camera 26 capture a surrounding image of the portable terminal 10. As described above, the buttons 20, the touch panel 69, and the rear touch panel 70 are provided on a housing surface of the portable terminal 10 and receive an operation input from the user. The three-axis gyro sensor 72 is provided inside the housing of the portable terminal 10 and detects angles or angular velocities of the portable terminal 10 on an XZ plane, a ZY plane, and a YX plane. The three-axis acceleration sensor 73 is provided inside the housing of the portable terminal 10 and detects acceleration in three axes: X, Y, and Z.

The data storage unit 60 is constituted with a recording medium such as a hard disk and stores various data files, such as documents, music, videos, that are used in the portable terminal 10 and data of applications for processing the data files. The data storage unit 60 also stores various physical quantities, motion equations, or the like that are used when calculating the behavior of an icon by applying the laws of physics. The icon table 62 stores the information of the icons associated with the data files or applications stored in the data storage unit 60.

FIG. 4 is a diagram showing exemplary internal data in the icon table. In the icon table 62, an icon ID column 80, an icon name column 81, a short name column 85, a path column 82, a coordinate column 83, and a shape data column 84 are provided. The icon ID column 80 stores ID for uniquely identifying an icon. The icon name column 81 stores the name of the icon. The short name column 85 stores the short name of the icon. The short name may be acquired in advance from the creator of the data or the user or may be automatically generated in accordance with a predetermined rule based on the name of the icon. The path column 82 stores a path that indicates a storage area, in the data storage unit 60, of a data file or an executable file of an application that is associated to the icon. The coordinate column 83 shows the position of a desktop screen at which the icon is to be displayed. The shape data column 84 stores shape data of the icon or information of a data file or the like that stores the shape data of the icon. In the present embodiment, all icons have the same shape. The shape data is stored in the data storage unit 60, and texture images on the surfaces of the respective icons are individually stored in the data storage unit 60.

The control unit 40 is constituted with a hardware circuit such as CPU or memory. In addition to providing a user interface function to the user, the control unit 40 executes an application, etc., started via the user interface function. The control unit 40 includes a user interface unit 41 and an application execution unit 48. The application execution unit 48 reads data that is necessary for the operation of a started application from the data storage unit 60 into memory and executes an application program. The user interface unit 41 includes a display control unit 42, an orientation position calculation unit 43, a motion calculation unit 44, a lighting calculation unit 45, and an input reception unit 46.

The orientation position calculation unit 43 acquires information detected by the three-axis gyro sensor 72 and the three-axis acceleration sensor 73 and calculates the orientation and position of the portable terminal 10 by analyzing the information. The orientation position calculation unit 43 calculates a current relative position of the portable terminal 10 in reference to a predetermined reference position, e.g., the position of the portable terminal 10 occurring when the orientation position calculation unit 43 is started upon power-on of the portable terminal 10, when a predetermined operation input is received, when a mode transitions into a predetermined operation mode, and when an operation input has not been received for at least a predetermined period of time. The orientation position calculation unit 43 calculates a current relative angle of the portable terminal 10 in reference to a predetermined reference orientation, e.g., the orientation of the portable terminal 10 occurring when the portable terminal 10 is placed on a horizontal flat surface or the orientation of the portable terminal 10 occurring when the orientation position calculation unit 43 is started upon power-on of the portable terminal 10, when some sort of operation input is received, when a mode transitions into some sort of operation mode, and when an operation input has not been received for at least a predetermined period of time. The function in the present embodiment may be provided when a predetermined operation input is being entered or during a period after a predetermined start operation is performed and before a predetermined end operation is performed. In this case, in reference to the position or orientation of the portable terminal 10 at the time when the entry of the predetermined operation input is started or when the predetermined start operation is performed, the orientation position calculation unit 43 calculates a change in the position and the orientation after that point of time.

The motion calculation unit 44 calculates, by applying the laws of physics, the behavior of a three-dimensional object that is displayed as an icon and the behavior of a plane surface, a curved surface, or the like that is displayed as a background image, which occur when a predetermined external force is applied. The motion calculation unit 44 reads the shape data of the three-dimensional object that is modeled with used of a polygon, a wire frame, etc., from the data storage unit 60 and calculates the position and the orientation by physics simulation that uses a physics engine. The motion calculation unit 44 may directly apply the laws of physics such as a motion equation, etc., so as to calculate the behavior of the object or may modify a partial or the entire laws of physics and then apply the modified laws of physics so as to deform and display a partial or the entire behavior of the object. For example, the value of a constant such as gravitational acceleration may be set to be a value that is different from the actual value or an equation such as a motion equation may be set to be an equation that is different from the actual equation. The motion calculation unit 44 may use a well-known arbitrary technique so as to perform a physical calculation. The motion calculation unit 44 calculates the position and orientation of the icon and notifies the display control unit 42 of the calculated position and orientation.

In rendering a three-dimensional object displayed as an icon, the lighting calculation unit 45 arranges, at a predetermined position, a light source that emits a light of predetermined intensity and calculates the brightness of a surface of the icon by applying a predetermined lighting model.

Upon reception of a double-click operation, a double-tap operation, or the like on an icon that is displayed on the desktop screen, the input reception unit 46 requests the application execution unit 48 to execute an application for opening a data file that is associated to the icon or to execute an application that is associated to the icon.

Upon reception of a selection command of data and application from the user for displaying an icon on the desktop screen, the display control unit 42 acquires image data, shape data, etc., that are necessary for displaying the icon associated to the received data or application and registers the acquired image data, shape data, etc., in the icon table 62. When displaying the desktop screen, the display control unit 42 displays the icon on the desktop screen in reference to the icon table 62. The display control unit 42 acquires the orientation or position of the portable terminal 10 that is calculated by the orientation position calculation unit 43 and causes the motion calculation unit 44 to calculate the position and orientation of the icon according to a change in the orientation and position of the portable terminal 10 so as to determine a display mode of the icon. The display control unit 42 displays the icon on the desktop screen by rendering a three-dimensional object that corresponds to the icon using the calculated position and orientation of the icon. In reference to figures, a detailed explanation is given of the function of the portable terminal 10 according to the present embodiment.

1-1. UI for Swinging Icons in Accordance with the Tilt of the Portable Terminal

Figure 5:
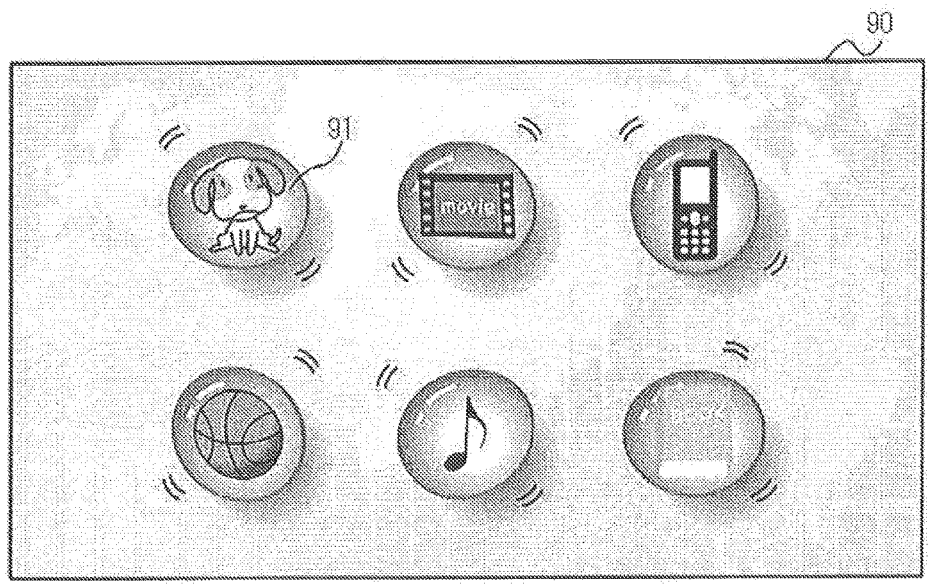
FIG. 5 shows an exemplary desktop screen displayed by a display control unit.

FIG. 5 shows an exemplary desktop screen displayed by a display control unit. A desktop screen 90 displays an icon 91 that is associated with data or an application stored in the data storage unit 60. The display control unit 42 determines a display mode of the icon 91 according to the tilt of the portable terminal 10 calculated by the orientation position calculation unit 43. In reference to the position and orientation of the portable terminal 10 occurring at predetermined time, e.g., when the power is turned on, when a predetermined operation is performed, when the mode transitions into a predetermined operation mode, when no operation has been received for at least a predetermined period of time, and when a change in the position or orientation of the portable terminal 10 of at least a predetermined amount has not been detected for at least a predetermined amount of time, the display control unit 42 sets a vertical direction of the screen occurring at that time to be a virtual direction of gravitational force. The display control unit 42 may set the direction of gravitational force in the real world as the virtual direction of gravitational force. The display control unit 42 may detect, e.g., the position of the eyes of the user by a technique such as face recognition with use of an image of the user captured by the upper camera 25 and set the line of sight of the user to be the virtual direction of gravitational force. For example, the display control unit 42 may set a direction from the position of the eyes of the user to the center of gravity position of the portable terminal 10 to be the virtual direction of gravitational force.

When the user holds the portable terminal 10 in a stationary condition, the display control unit 42 displays the icon 91 in such a manner that the icon 91 appears to swing centering a reference position. The display control unit 42 may determine a moving direction and the amount of displacement of the icon 91 with use of a random number, etc., so as to move the icon 91. Alternatively, the display control unit 42 may animation display the icon 91 with use of moving image data stored in advance in the data storage unit 60. In the former case, the display control unit 42 may set a limit such that the icon 91 does not move outside a predetermined range from the reference position. Then, when there is a change in the tilt of the portable terminal 10, the display control unit 42 causes the motion calculation unit 44 to calculate the behavior of the icon occurring at that time so as to incorporate the calculated behavior into the display. In addition to acquiring a direction of gravity to be applied to the icon from the display control unit 42, the motion calculation unit 44 reads physical quantities such as the value of the gravitational acceleration and the rotation moment of the icon 91 from the data storage unit 60 and then applies those physical quantities so as to calculate the behavior of the icon 91. The display control unit 42 incorporates the calculated behavior of the icon 91 into the display.

In an example shown in the figure, the display control unit 42 fixes a predetermined position, e.g., the center of gravity position, of the icon 91 and causes the motion calculation unit 44 to calculate the orientation of the icon 91. In other words, while randomly moving the position of the icon 91 within a predetermined range as described above, the display control unit 42 tilts the icon 91 according to a change in the tilt of the portable terminal 10 and displays such that the icon 91 appears to swing. For example, when the portable terminal 10 is tilted such that the left side of the portable terminal 10 is lowered, the icon 91 tilts in a relative manner such that the right side of the icon 91 is lowered. When the portable terminal 10 is swung from side to side, the icon 91 also swings from side to side.

When the portable terminal 10 is tilted, the display control unit 42 may move the icon 91 toward a direction of the tilt by a predetermined amount. In this case, the amount of displacement may be larger than the amount of displacement of the icon 91 occurring when the portable terminal 10 is not tilted. In other words, when the portable terminal 10 is not tilted, the display control unit 42 moves the icon 91 little by little within a first range; when the portable terminal 10 is tilted, the display control unit 42 moves the icon 91 according to the tilt within a second range, which is larger than the first range.

As described, it appears as if a three-dimensional object that corresponds to the icon 91 is actually arranged on the screen of the display device 68, and the icon 91 is displayed in such a manner that the object appears to swing in response to a swing of the portable terminal 10 when the portable terminal 10 is swung. Therefore, for example, the hand movement of the user holding the portable terminal 10 is incorporated into the display of the icon 91, allowing highly visual effects with high entertainment value that are very unique to the portable terminal 10 to be provided.

The display control unit 42 may change the behavior of the icon in accordance with the attributes of the icon, e.g., the type of a data file or application that corresponds to the icon, the amount of data, the date and time of creation, the date and time of change, the date and time of start-up, the presence or absence of the latest information, etc. For example, the value of the virtual gravitational acceleration, etc., may be adjusted so that, the smaller the amount of data is, or the newer or older the date and time of creation, the date and time of change, or the date and time of start-up are, the larger or smaller the swing of the icon becomes. An icon set as a favorite by the user may swing more widely or slightly compared to how other icons swing. With this, a difference or a similarity in attributes of icons can be displayed in an easily understood manner, visually, and the highly operable user interface can thus be provided.

The display control unit 42 may bring an icon into a stationary condition upon reception of a predetermined operation, e.g., an operation of tapping the desktop screen. The display control unit 42 may bring all icons or a specific icon into a stationary condition. For example, when the user taps an area of the desktop screen on which no icon is displayed, all the icons may be brought into a stationary condition. When the user taps a specific icon, only the tapped icon may be brought into a stationary condition. The display control unit 42 may determine an icon to be brought into a stationary condition according to the attribute of the icon. For example, only an icon that is set as a favorite by the user may be brought into a stationary condition.

1-2. UI for Moving Icons in Accordance with the Tilt of the Portable Terminal

Figure 6:
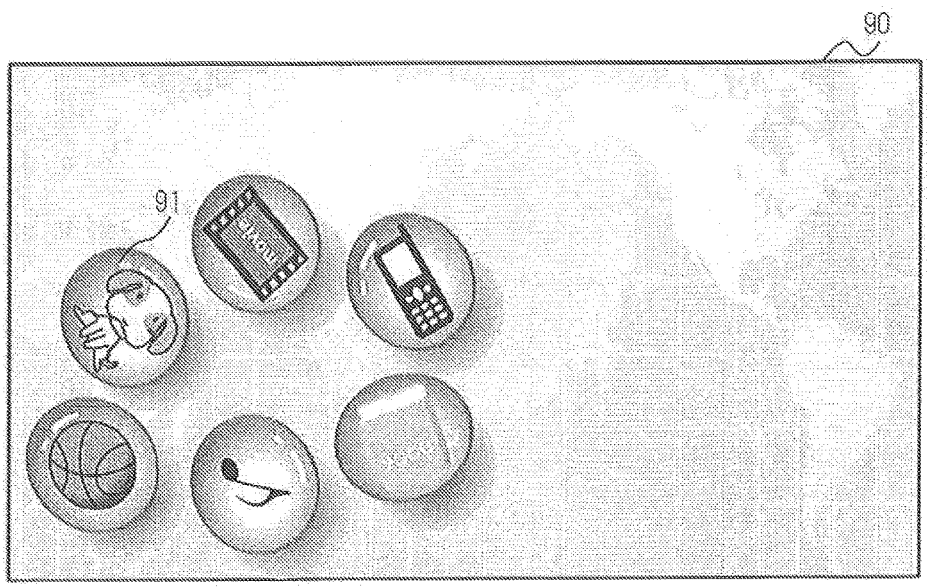
FIG. 6 shows an exemplary desktop screen displayed by a display control unit.

FIG. 6 shows an exemplary desktop screen displayed by the display control unit. In the example shown in the figure, the display control unit 42 swings the icon slightly when the degree of the tilt of the portable terminal 10 is smaller than a predetermined value and determines a display mode of the icon 91 in accordance with the tilt of the portable terminal 10 when the degree of the tilt of the portable terminal 10 is larger than the predetermined value, as in the case of the 1-1 example. In the example shown in the figure, the display control unit 42 moves the icon 91 within the range of the desktop screen without fixing the position of the icon 91. Therefore, when the portable terminal 10 is tilted such that the left side of the portable terminal 10 is lowered, the icon 91 slides toward the left direction on the desktop screen. The motion calculation unit 44 acquires physical quantities such as the direction of gravity to be applied to the icon 91, the value of the gravitational acceleration, a coefficient of static friction and coefficient of dynamic friction between the icon and a floor on which the icon is placed, a coefficient of collision between icons, a coefficient of collision between a wall that is virtually set at the edge of the desktop screen and the icon, etc., and then applies those physical quantities so as to calculate the behavior of the icon 91. With this, it appears as if a three-dimensional object that corresponds to the icon 91 is actually arranged on the screen of the display device 68, and the icon 91 is displayed in such a manner that the object appears to move in response to a tilt of the portable terminal 10 when the portable terminal 10 is tilted. Therefore, highly visual effects with high entertainment value that are very unique to the portable terminal 10 can be provided.

As shown in the 1-2 example, there are occasions when it becomes hard for the user to operate the icon 91 if the icon 91 is moved in accordance with the tilt of the portable terminal 10. Therefore, the icon 91 may be usually displayed such that the icon 91 appears to swing within the predetermined range as shown in the 1-1 example. Alternatively, in an operation mode in which an application cannot be started by an operation of double-clicking the icon or the like, for example, when an operation input has not been received from the user for at least the predetermined period of time or when the user interface function is temporarily disabled by a hold key (not shown) or the like, the icon may be displayed such that the icon slides toward the direction of the tilt as shown in the 1-2 example.

The display control unit 42 may change the moving speed and displacement distance of the icon, the angle of the portable terminal 10 when the icon starts to move, etc., in accordance with the attributes of the icon, e.g., the type of a data file or application that corresponds to the icon, the amount of data, the date and time of creation, the date and time of change, the date and time of start-up, the presence or absence of the latest information, etc. For example, the value of the virtual gravitational acceleration and dynamic friction coefficient, etc., may be adjusted so that, the smaller the amount of data is, or the newer or older the date and time of creation, the date and time of change, or the date and time of start-up are, the larger the displacement of the icon becomes. With this, a difference or a similarity in attributes of icons can be displayed in an easily understood manner, visually, and the highly operable user interface can thus be provided. An icon set as a favorite by the user, an icon having the latest information, etc., may be set to stay at the current position without moving. This allows the icon set as a favorite and the rest of the icons to be easily sorted in a distinguishable manner. The display control unit 42 may sort an icon to be moved and an icon not to be moved in a distinguishable manner based on the attributes of the rest of the icons.

The display control unit 42 may bring the icon into a stationary condition upon reception of a predetermined operation, e.g., an operation of tapping the desktop screen. The display control unit 42 may bring all icons or a specific icon into a stationary condition. For example, when the user taps an area of the desktop screen on which no icon is displayed, all the icons may be brought into a stationary condition. When the user taps a specific icon, only the tapped icon may be brought into a stationary condition. The display control unit 42 may determine an icon to be brought into a stationary condition according to the attributes of the icon. For example, only an icon that is set as a favorite by the user may be brought into a stationary condition.

Figure 7:
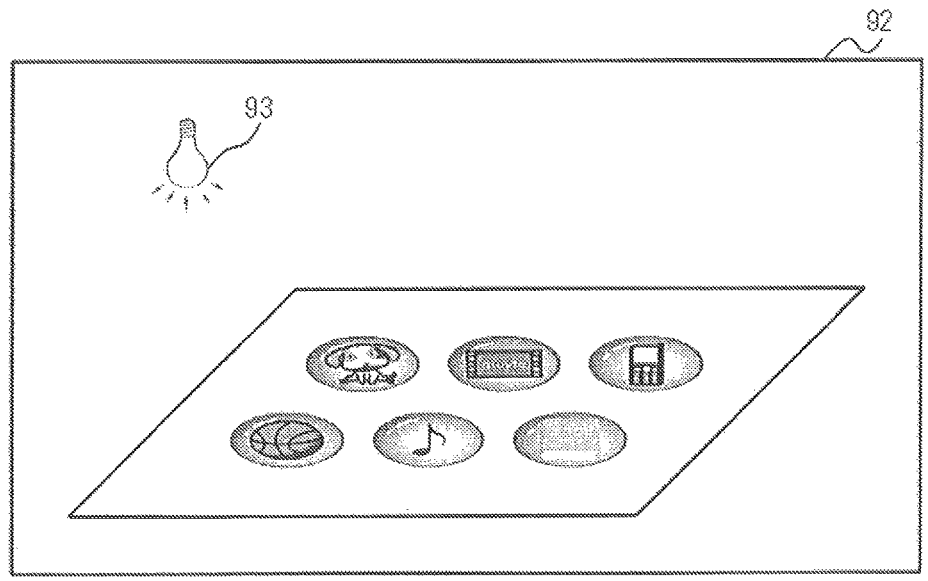
FIG. 7 is a diagram explaining a function of changing a light that hits icons.
Figure 8:
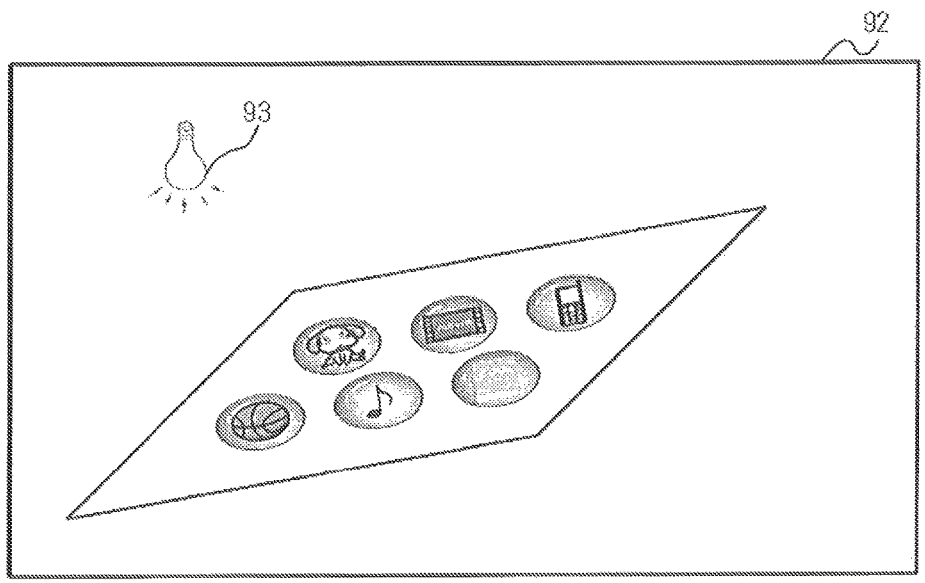
FIG. 8 is a diagram explaining a function of changing a light that hits the icons.

1-3. UI for Changing a Light that Hits Icons in Accordance with the Orientation or Position of the Portable Terminal FIGS. 7 and 8 are diagrams explaining a function of changing a light that hits an icon. As shown in FIG. 7, the lighting calculation unit 45 arranges the portable terminal 10 with an icon arranged on the surface thereof at a predetermined position of a virtual three-dimensional world 92, arranges a light source 93 at a predetermined position, and calculates the brightness of a surface of the icon by applying a predetermined model of flat shading, Phong shading, etc. When there is a change in the orientation or position of the portable terminal 10, the lighting calculation unit 45 changes the position and orientation of the icon in the virtual three-dimensional world 92 in accordance with the change as shown in FIG. 8. With this, a relative position between the light source 93 and the icon changes, and a light that hits the icon thus changes. This allows a three-dimensional object that corresponds to the icon to be displayed as if the three-dimensional object is actually arranged on the screen of the display device 68 of the portable terminal 10 and the lighting that hits the icon to be displayed such that the lighting appears to change in response to a change in the position or orientation of the portable terminal 10. The lighting calculation unit 45 may change the position of the light source 93 in accordance with the orientation or position of the portable terminal 10.

Figure 9:
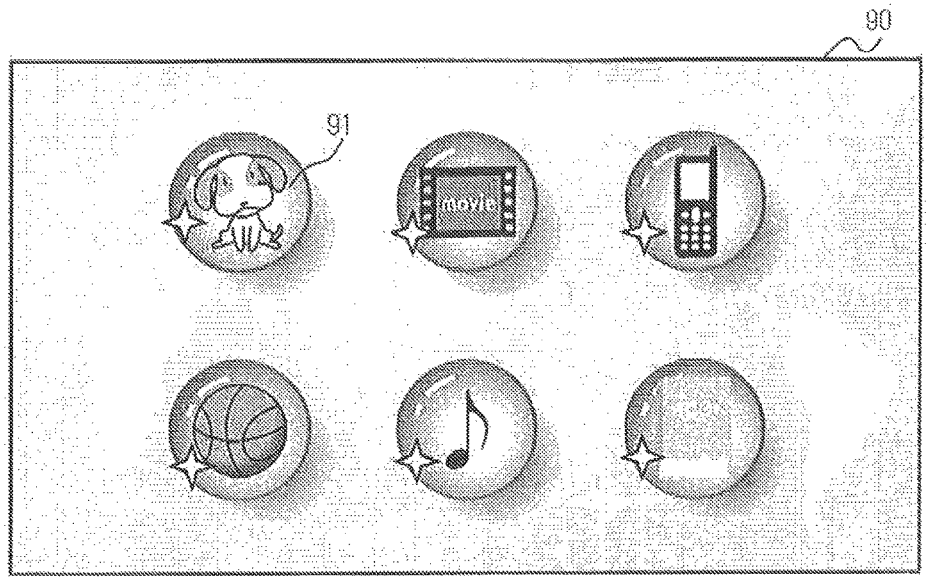
FIG. 9 shows an exemplary desktop screen displayed by the display control unit.
Figure 10:
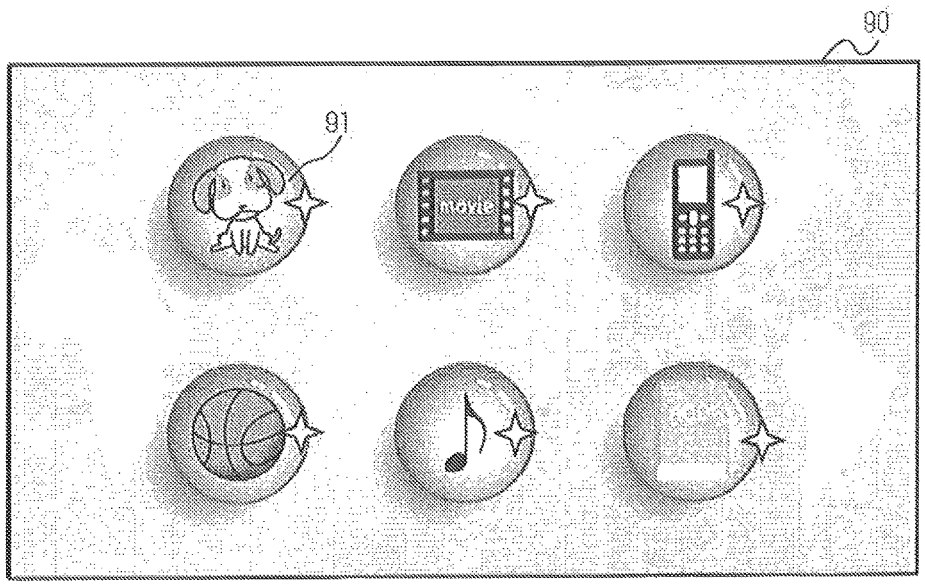
FIG. 10 shows an exemplary desktop screen displayed by the display control unit.

FIGS. 9 and 10 each show an exemplary desktop screen displayed by the display control unit. In FIG. 9, since a light hits the icon 91 from the upper left, the left side of the icon 91 shines, and the shadow of the icon is displayed on the right side of the icon 91. In FIG. 10, due to a change made on the orientation or position of the portable terminal 10, a light hits the icon 91 from the upper right. Thus, the right side of the icon 91 shines, and the shadow of the icon is displayed on the left side of the icon 91. The lighting calculation unit 45 may further arrange a plane of projection of the shadow in the virtual three-dimensional world so as to calculate the shadow of the icon. Alternatively, the lighting calculation unit 45 may store one type of a texture image for displaying the shadow of the icon or a plurality of types of texture images in accordance with a distance between the icon and the projection plane in advance in the data storage unit 60 so as to display the shadow of the icon by adjusting the display position of a texture image in accordance with a relative position with respect to the light source 93 and the icon 91.

The display control unit 42 may change the way the icon shines in accordance with the attributes of the icon, e.g., the type of a data file or application that corresponds to the icon, the amount of data, the date and time of creation, the date and time of change, the date and time of start-up, the presence or absence of the latest information, etc. For example, the distance between the icon and the light source may be shortened or the intensity of a light from the light source may be increased when calculating the lighting of the icon such that, the smaller the amount of data is, or the newer the date and time of creation, the date and time of change, or the date and time of start-up are, the more intensively the icon shines. An icon set as a favorite by the user, an icon having the latest information, etc., may be set to shine more intensively compared to other icons. In addition to the intensity of the light, the color of the light, etc., may also be changed.

1-4. UI for Scrolling Through Characters when the Portable Terminal is Tilted

Figure 11:
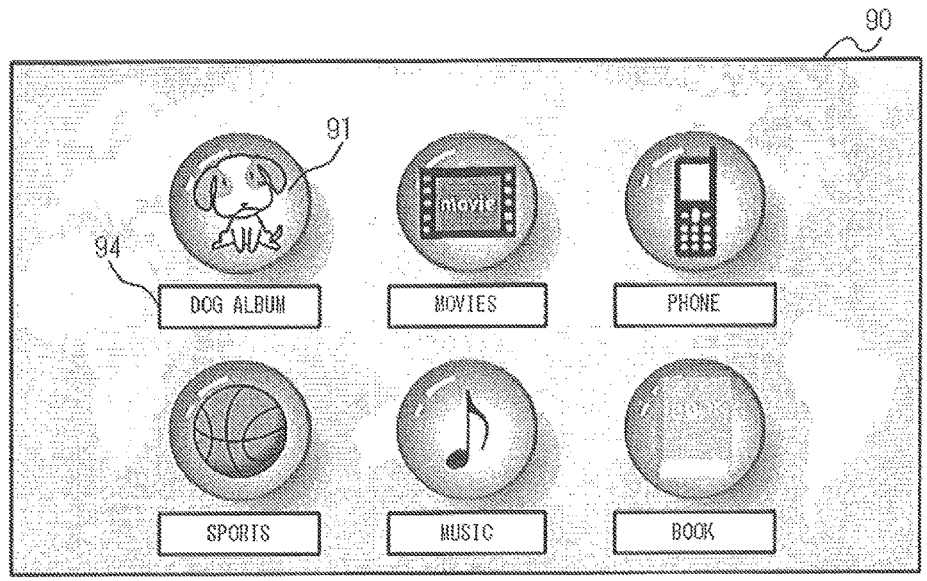
FIG. 11 is a diagram explaining a function of scrolling through characters.

FIGS. 11-14 are diagrams explaining a function of scrolling through characters. In FIG. 11, a name display area 94 for displaying the name of the icon 91 is provided near the icon 91. The display control unit 42 reads the short name of the icon 91 from the icon table 62 and then displays the short name in each name display area 94 of the icon 91. The short name of the icon is set such that the number of the characters thereof is smaller than the number of characters that can be displayed in the name display area 94.

Figure 12:
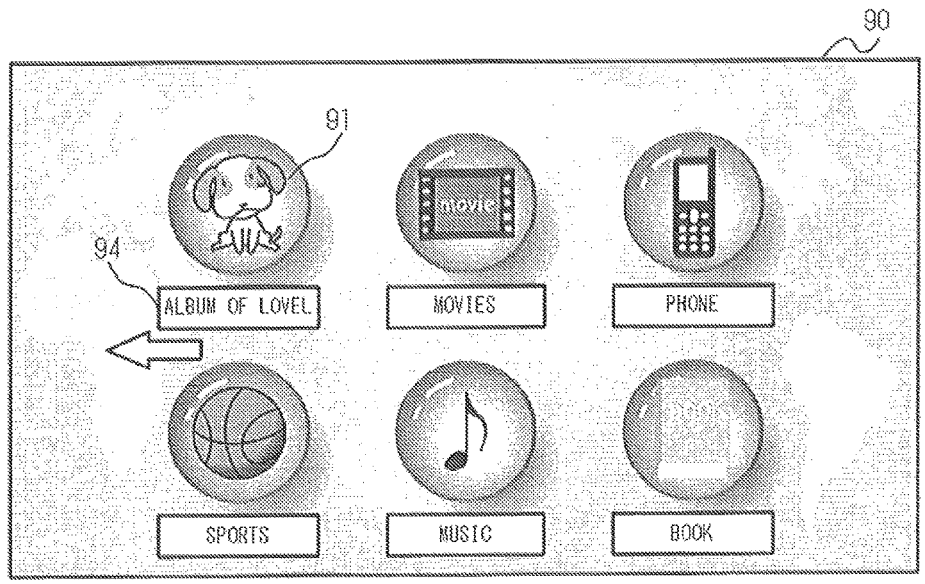
FIG. 12 is a diagram explaining a function of scrolling through the characters.
Figure 13:
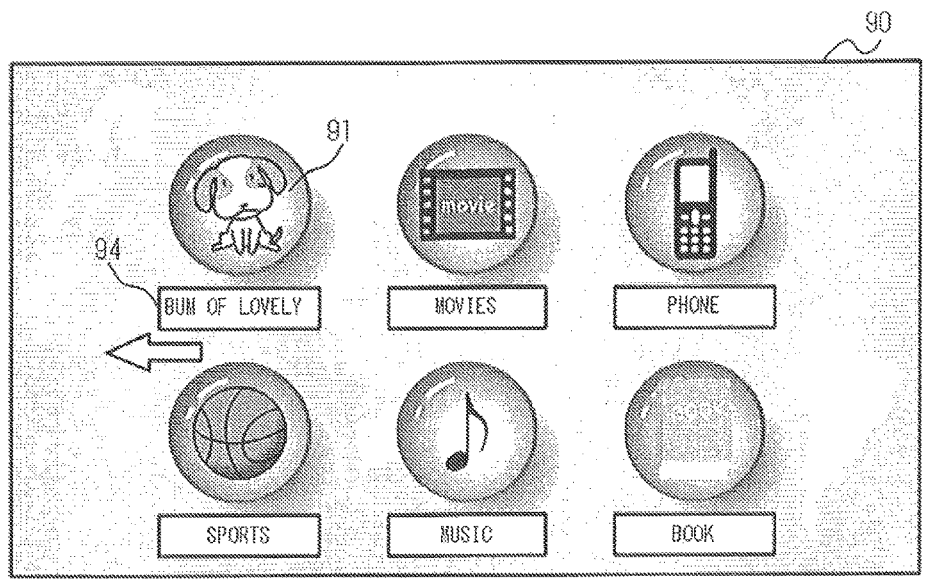
FIG. 13 is a diagram explaining a function of scrolling through the characters.
Figure 14:
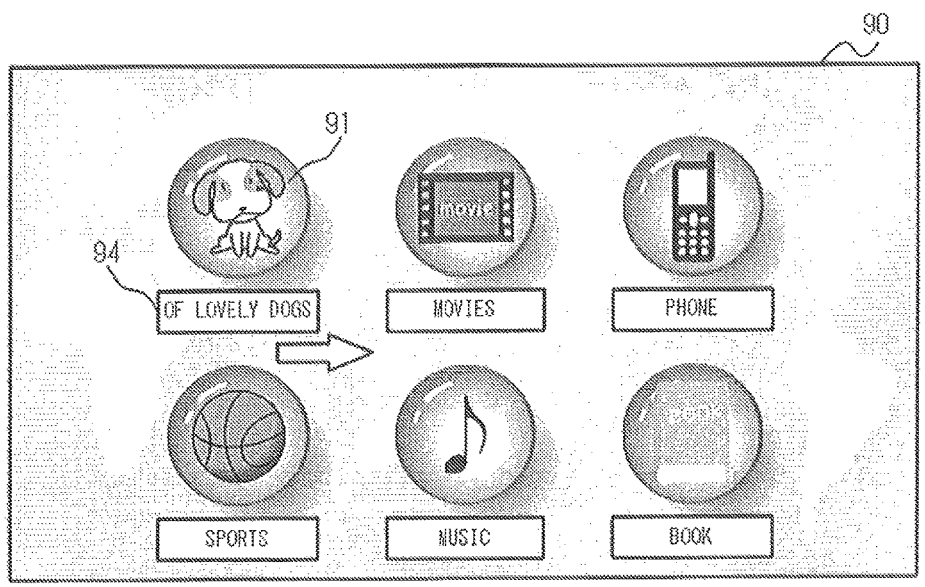
FIG. 14 is a diagram explaining a function of scrolling through the characters.

When the portable terminal 10 is tilted by at least a predetermined angle such that the left side of the portable terminal 10 becomes lowered while the desktop screen shown in FIG. 11 is displayed, the display control unit 42 first reads the name of the icon 91 from the icon table 62 and then displays the name, instead of the short name, in the name display area 94 as shown in FIG. 12. If the number of the characters in the name exceeds the number of characters that can be displayed in the name display area 94, the first few characters in the name that can be displayed are displayed. Then, as shown in FIG. 13, the name of the icon displayed in the name display area 94 is scrolled to the left so as to display the portion of the name that is not being displayed. This allows the entire name of the icon to be shown by the scrolling even when the name of the icon is too long to be displayed in the name display area 94. Thus, the user-friendliness can be improved. Since the name of the icon is displayed in such a manner that the name of the icon slides by tilting the portable terminal 10, a user interface that is visually entertaining and easy to understand intuitively can be provided. Only for an icon whose entire name cannot be displayed, the display control unit 42 may allow the name of the icon to be scrolled. The display control unit 42 may display the name of an icon in a plurality of lines. In this case, the name of the icon may be scrolled to the top when the portable terminal 10 is tilted by at least a predetermined angle such that the upper side of the portable terminal 10 is lowered.

When the portable terminal 10 is tilted by at least the predetermined angle such that the right side of the portable terminal 10 becomes lowered while the desktop screen shown in FIG. 11 is displayed, the display control unit 42 reads the name of the icon 91 from the icon table 62 and then displays the last few characters in the name that can be displayed as shown in FIG. 13. Then, the name of the icon is scrolled to the right so as to display the portion of the name that is not being displayed. With this, the user only needs to tilt the portable terminal 10 to the left when the user wishes to check the first part of the name of the icon and to the right when the user wishes to check the last part of the name of the icon. Thus, a user interface that is easy to understand intuitively and that is highly operable can be provided.

The display control unit 42 may determine scrolling speed in accordance with a tilted angle of the portable terminal 10. For example, the larger the tilted angle is, the faster the scrolling may be performed. The display control unit 42 may stop scrolling when the tilted angle of the portable terminal 10 becomes smaller than a predetermined angle. The display control unit 42 may display the short name of the icon again in the name display area 94 when a condition, where the tilted angle of the portable terminal 10 is smaller than the predetermined angle, continues for at least a predetermined period of time. The display control unit 42 may stop scrolling upon reception of a predetermined operation, e.g., an operation of tapping the name display area 94, when the name of the icon is being scrolled.

1-5. UI for Switching a Background Image when the Portable Terminal is Tilted

Figure 15:
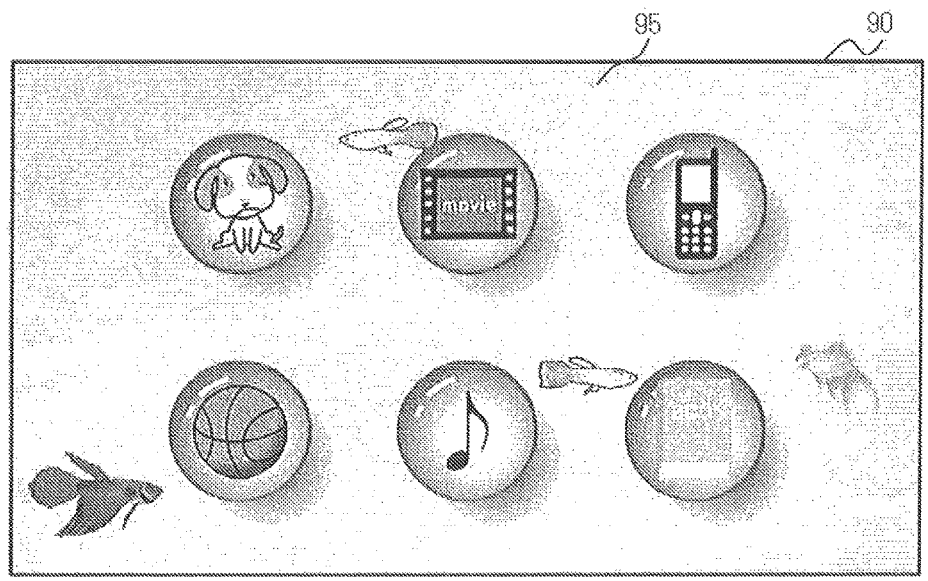
FIG. 15 is a diagram explaining a function of switching a background image.
Figure 16:
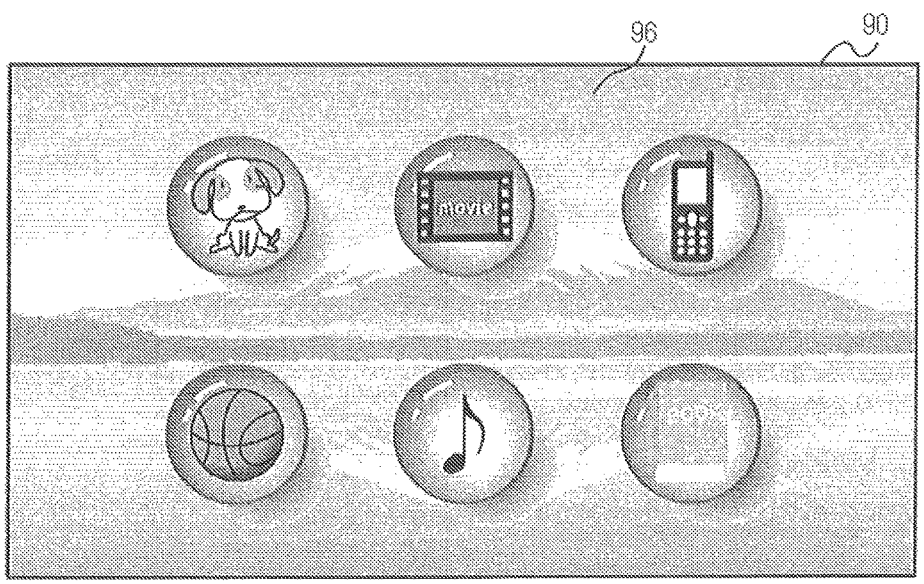
FIG. 16 is a diagram explaining a function of switching the background image.

FIGS. 15 and 16 are diagrams explaining a function of switching a background image. In a desktop screen shown in FIG. 15, an image of a water tank seen from above is displayed as a background image 95. In a desktop screen shown in FIG. 16, an image of a landscape is displayed as a background image 96. The display control unit 42 displays an image of an object seen from above, as shown in FIG. 15, when a tilt of the portable terminal 10 has less than a predetermined angle from the horizontal. The display control unit 42 displays an image of a landscape that is viewed, as shown in FIG. 16, when the portable terminal 10 is tilted by at least the predetermined angle from the horizontal such that the upper side of the portable terminal 10 is raised. The background image 95 and the background image 96 are stored in advance in the data storage unit 60. The display control unit 42 reads the background image 95 or the background image 96 from the data storage unit 60 in accordance with the tilt of the portable terminal 10 and displays the background image 95 or the background image

96. With this, the display control unit 42 displays, as the background image 95, an image of an object that appears to be viewed from above when the desktop screen of the display device 68 is viewed from above while the user holds the portable terminal 10 almost horizontally or while the portable terminal 10 is being placed on a table or the like and displays, as the background image 96, an image of a landscape that appears to be being viewed when the user holds up the portable terminal 10 while the portable terminal 10 is being tilted by at least the predetermined angle from the horizontal. Thus, an image suitable for the line of sight of the user can be displayed, and an effect can be realized where it appears as if the object displayed as the background image 95 exists at the user's feet and as if the view of the landscape displayed as the background image 96 unfolds around the user. This allows a user interface with high entertainment value to be provided.

Three or more background images may be stored in advance in the data storage unit 60, and these background images may be switched for display in accordance with the tilt of the portable terminal 10. The position and shape data of a three-dimensional object that constitutes a background may be stored in advance in the data storage unit 60, and the display control unit 42 may read the position and the shape data and set a viewpoint position and the line of sight in accordance with the tilt of the portable terminal 10 so as to render a background image. In this case, the display control unit 42 may continuously change the background image in accordance with the tilt of the portable terminal 10.

1-6. UI for Causing Icons to Jump when the Portable Terminal is Flipped Up

Figure 17:
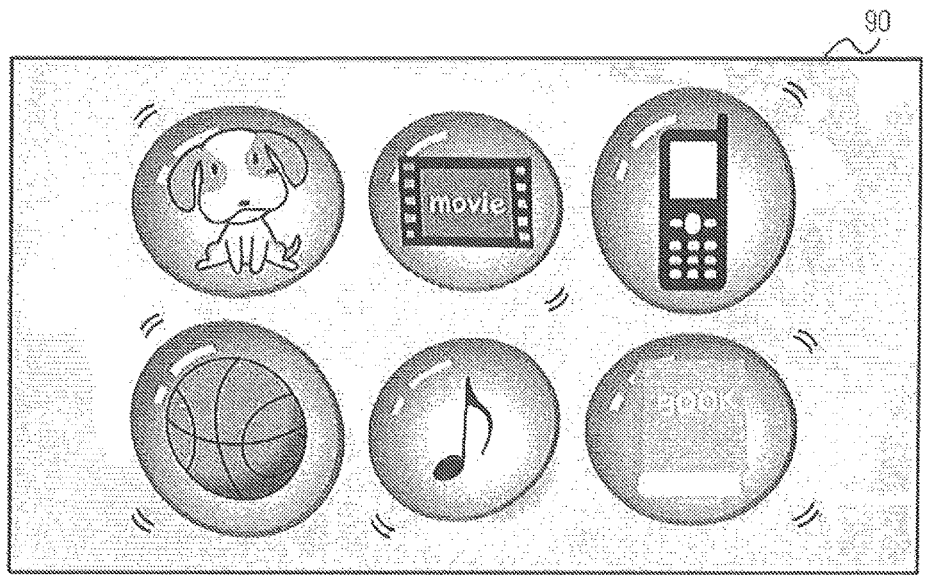
FIG. 17 is a diagram explaining a function of causing the icons to jump.
Figure 18:
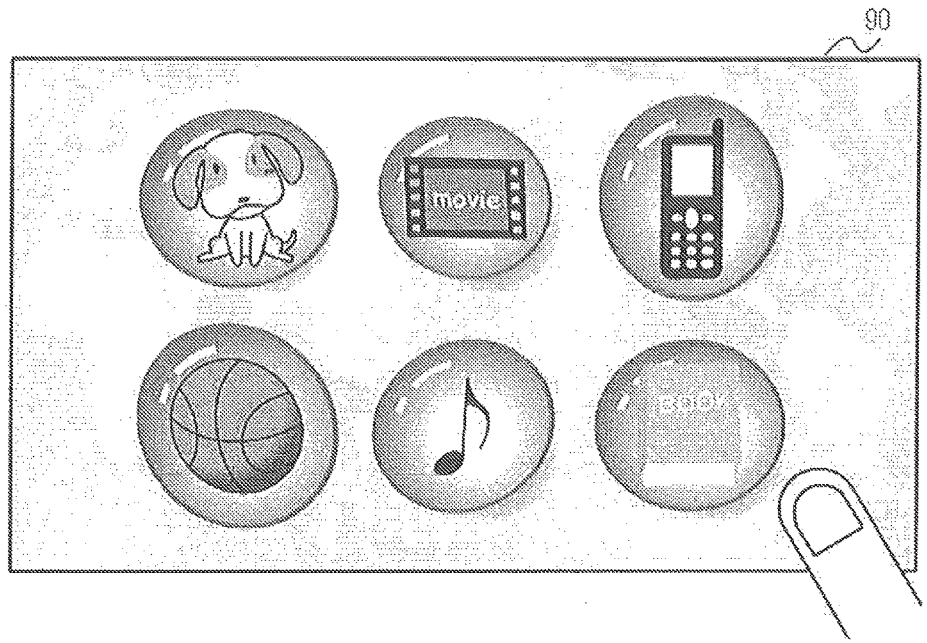
FIG. 18 is a diagram explaining the function of causing the icons to jump.

FIGS. 17 and 18 are diagrams explaining a function of causing an icon to jump. After the portable terminal 10 is moved in a vertically upward direction with respect to the screen of the display device 68 by the user with acceleration of at least a predetermined value, when the portable terminal 10 is stopped moving at that site or is moved in a vertically downward direction, the display control unit 42 displays a jumping effect of the icon 91 as shown in FIG. 17. The display control unit 42 acquires, from the orientation position calculation unit 43, the value of acceleration in a vertically upward direction with respect to the screen of the display device 68 of the portable terminal 10. When the acquired value is at least the predetermined value, the display control unit 42 brings force that is calculated based on the acceleration to act on the icon and causes the motion calculation unit 44 to calculate the jumping behavior of the icon 91. In this case, the motion calculation unit 44 may read physical quantities such as the mass, rotation moment, and air resistance of the icon 91 from the data storage unit 60 so as to use the physical quantities for calculation. The behavior of the icon may be changed in accordance with the attributes of the icon, e.g., the type of a data file or application that corresponds to the icon, the amount of data, the date and time of creation, the date and time of change, the date and time of start-up, the presence or absence of the latest information, etc. For example, the mass, the value of the virtual gravitational acceleration, or the value of the air resistance may be set to be small so that, the smaller the amount of data is, or the newer the date and time of creation, the date and time of change, or the date and time of start-up are, the higher the icon jumps. An icon set as a favorite by the user, an icon having the latest information, etc., may be set to jump higher compared to other icons.

In addition to displaying the icon with use of the orientation or position of the icon calculated by the motion calculation unit 44, the display control unit 42 blurs the background image and displays the icon in such a manner that it is easy to visually understand that the icon appears to jump. A blurred background image, in addition to the background image, may be stored in the data storage unit 60. The display control unit 42 may read the blurred background image from the data storage unit 60 and switch the background image with the blurred background image when the icon is jumping or blur the background image with use of a well-known image processing technique. In the former case, a plurality of types of background images may be stored in advance in the data storage unit 60 in accordance with the height of the jump of the icon, and the display control unit 42 may switch between the background images in accordance with the height of the icon. In the latter case, the higher the height of the icon is, the larger the degree of blur may become.

The display control unit 42 may express the jumping effect of the icon 91 by enlarging the image of the icon 91. The display control unit 42 may express the jumping effect of the icon 91 by bringing the viewpoint position, occurring when the icon 91 is rendered, to be closer to the icon 91.

When the user performs a predetermined operation input, e.g., an operation of tapping the desktop screen 90, while the icon 91 is being flipped up, the display control unit brings the icon 91 into a stationary condition when the operation input is received, as shown in FIG. 18. This allows the icon 91 to be enlarged for a better view, and the user-friendliness can thus be improved. Also, a noble user interface that is also visually entertaining can be provided where a display area is not merely zoomed in but is enlarged by stopping an icon from moving after the icon is flipped up.

The display control unit 42 may bring all icons or a specific icon into a stationary condition. For example, when the user taps an area of the desktop screen 90 on which the icon is not displayed, all the icons may be brought into a stationary condition. When the user taps a specific icon, only the tapped icon may be brought into a stationary condition. The display control unit 42 may determine an icon to be brought into a stationary condition according to the attributes of the icon. For example, only an icon that is set as a favorite by the user may be brought into a stationary condition.

When not only the acceleration applied in a vertically upward direction with respect to the display screen of the display device 68 but also acceleration of at least a predetermined amount or angular acceleration of at least a predetermined amount is applied to the portable terminal 10, the display control unit 42 may bring force that is calculated with use of the acceleration or angular acceleration calculated by the orientation position calculation unit 43 to act on the icon 91 and may cause the motion calculation unit 44 to calculate the behavior of the icon 91 so that the calculated behavior is incorporated into the display. For example, the icon may be swung as in the 1-1 example or may be moved as in the 1-2 example. Alternatively, the icon may be rotated.

The above functions may be independently used for the portable terminal 10, or an optional combination of two or more of the functions may be used for the portable terminal 10.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

What is claimed is:

1. A portable terminal comprising:
   a display device;
   a sensor configured to detect an orientation or position of the portable terminal;
   a storage unit configured to store data; and
   a display control unit configured to display on the display device one or more icons or objects that correspond to the data stored in the storage unit, wherein:
   the display control unit acquires information regarding the orientation or position of the portable terminal from the sensor and determines a display mode of the icons or objects in accordance with a change in the orientation or position of the portable terminal,
   the information includes whether a magnitude of acceleration of the portable terminal in a direction perpendicular to a screen of the display device exceeds a predetermined value, and
   in response to the information that the magnitude of acceleration exceeds the predetermined value, the display control unit causes the icons or objects on the screen of the display device to appear to a user of the portable terminal to jump in the direction of the magnitude of acceleration by enlarging sizes of the icons or objects on the screen of the display device.

2. The portable terminal according to claim 1, wherein the display control unit further causes the icons or objects on the screen of the display device to appear to jump in the direction of the magnitude of acceleration by: (i) gradually enlarging the sizes of the icons or objects on the screen of the display device from original sizes to enlarged sizes; and (ii) thereafter gradually reducing the sizes of the icons or objects on the screen of the display device from the enlarged sizes back to the original sizes.

3. The portable terminal according to claim 2, wherein upon reception of a specific command from the user during a period of time in which the display control unit is gradually enlarging the sizes of the icons or objects on the screen of the display device, or has enlarged the sizes of the icons or objects on the screen of the display device to the enlarged sizes, the display control unit freezes positions and sizes of the icons or objects on the screen of the display device.

4. The portable terminal according to claim 3, wherein upon continued reception of the specific command from the user, the display control unit does not thereafter gradually reduce the sizes of the icons or objects on the screen of the display device from the enlarged sizes back to the original sizes.

5. The portable terminal according to claim 4, wherein upon release of the specific command from the user, the display control unit thereafter gradually reduces the sizes of the icons or objects on the screen of the display device from the enlarged sizes back to the original sizes.

6. The portable terminal according to claim 1, wherein in response to the information that the magnitude of acceleration exceeds the predetermined value, the display control unit causes the icons or objects on the screen of the display device to appear to jump in the direction of the magnitude of acceleration by both enlarging the sizes of the icons or objects and blurring a background image on the screen of the display device.

7. The portable terminal according to claim 1, wherein the display control unit, from the information regarding the orientation of the portable terminal, calculates virtual gravity acting upon the icons or objects in accordance with a tilt of the portable terminal, and modifies the appearance of the icons or objects on the screen of the display device to jump in the direction of the magnitude of acceleration based on the virtual gravity.

8. The portable terminal according to claim 1, wherein the display control unit modifies the appearance of the icons or objects on the screen of the display device to jump in the direction of the magnitude of acceleration based on one or more icon attributes selected from the group comprising: type of data file associated with the icon; amount of data associated with the icon; date and time of creation of the associated file; date and time of change of the associated file; date and time of start-up of the device; and presence or absence of the latest information for the associated file.

9. A display method, comprising:
   acquiring, from a sensor for detecting an orientation or position of a portable terminal, information regarding the orientation or position of the portable terminal; and
   determining, when displaying one or more icons or objects that correspond to data stored in a storage unit for storing data on a display device, a display mode of the icons or objects in accordance with a change in the orientation or position of the portable terminal; and
   displaying the icons or objects on a screen of the display device, wherein:
   the information includes whether a magnitude of acceleration of the portable terminal in a direction perpendicular to a screen of the display device exceeds a predetermined value, and
   in response to the information that the magnitude of acceleration exceeds the predetermined value, the display step includes causing the icons or objects on the screen of the display device to appear to a user of the portable terminal to jump in the direction of the magnitude of acceleration by enlarging sizes of the icons or objects on the screen of the display device.

10. The display method according to claim 9, wherein the step of displaying further causes the icons or objects on the screen of the display device to appear to jump in the direction of the magnitude of acceleration by: (i) gradually enlarging the sizes of the icons or objects on the screen of the display device from original sizes to enlarged sizes; and (ii) thereafter gradually reducing the sizes of the icons or objects on the screen of the display device from the enlarged sizes back to the original sizes.

11. The display method according to claim 10, wherein upon reception of a specific command from the user during a period of time in which the displaying step is gradually enlarging the sizes of the icons or objects on the screen of the display device, or has enlarged the sizes of the icons or objects on the screen of the display device to the enlarged sizes, the display step includes freezing positions and sizes of the icons or objects on the screen of the display device.

12. The display method according to claim 11, wherein upon continued reception of the specific command from the user, the displaying step does not thereafter gradually reduce the sizes of the icons or objects on the screen of the display device from the enlarged sizes back to the original sizes.

13. The display method according to claim 12, wherein upon release of the specific command from the user, the displaying step thereafter gradually reduces the sizes of the icons or objects on the screen of the display device from the enlarged sizes back to the original sizes.

14. The display method according to claim 9, wherein in response to the information that the magnitude of acceleration exceeds the predetermined value, the displaying step causes the icons or objects on the screen of the display device to appear to jump in the direction of the magnitude of acceleration by both enlarging the sizes of the icons or objects and blurring a background image on the screen of the display device.

15. The display method according to claim 9, wherein the displaying step, from the information regarding the orientation of the portable terminal, calculates virtual gravity acting upon the icons or objects in accordance with a tilt of the portable terminal, and modifies the appearance of the icons or objects on the screen of the display device to jump in the direction of the magnitude of acceleration based on the virtual gravity.

16. The display method according to claim 9, wherein the displaying step modifies the appearance of the icons or objects on the screen of the display device to jump in the direction of the magnitude of acceleration based on one or more icon attributes selected from the group comprising: type of data file associated with the icon; amount of data associated with the icon; date and time of creation of the associated file; date and time of change of the associated file; date and time of start-up of the device; and presence or absence of the latest information for the associated file.

17. A non-transitory, computer-readable recording medium containing a computer program, which when executed by a computer, causes the computer to carry out actions, comprising:
   acquiring, from a sensor for detecting an orientation or position of a portable terminal, information regarding the orientation or position of the portable terminal; and
   determining, when displaying one or more icons or objects that correspond to data stored in a storage unit for storing data on a display device, a display mode of the icons or objects in accordance with a change in the orientation or position of the portable terminal; and
   displaying the icons or objects on a screen of the display device, wherein:
   the information includes whether a magnitude of acceleration of the portable terminal in a direction perpendicular to a screen of the display device exceeds a predetermined value, and
   in response to the information that the magnitude of acceleration exceeds the predetermined value, the display step includes causing the icons or objects on the screen of the display device to appear to a user of the portable terminal to jump in the direction of the magnitude of acceleration by enlarging sizes of the icons or objects on the screen of the display device.

18. The non-transitory, computer-readable recording medium according to claim 17, wherein:
   the step of displaying further causes the icons or objects on the screen of the display device to appear to jump in the direction of the magnitude of acceleration by: (i) gradually enlarging the sizes of the icons or objects on the screen of the display device from original sizes to enlarged sizes; and (ii) thereafter gradually reducing the sizes of the icons or objects on the screen of the display device from the enlarged sizes back to the original sizes;
   upon reception of a specific command from the user during a period of time in which the displaying step is gradually enlarging the sizes of the icons or objects on the screen of the display device, or has enlarged the sizes of the icons or objects on the screen of the display device to the enlarged sizes, the display step includes freezing positions and sizes of the icons or objects on the screen of the display device; and
   upon continued reception of the specific command from the user, the displaying step does not thereafter gradually reduce the sizes of the icons or objects on the screen of the display device from the enlarged sizes back to the original sizes.

19. The non-transitory, computer-readable recording medium according to claim 18, wherein upon release of the specific command from the user, the displaying step thereafter gradually reduces the sizes of the icons or objects on the screen of the display device from the enlarged sizes back to the original sizes.

20. The non-transitory, computer-readable recording medium according to claim 17, wherein in response to the information that the magnitude of acceleration exceeds the predetermined value, the displaying step causes the icons or objects on the screen of the display device to appear to jump in the direction of the magnitude of acceleration by both enlarging the sizes of the icons or objects and blurring a background image on the screen of the display device.

* * * * *